United States Patent
Lötters

(10) Patent No.: US 6,988,400 B2
(45) Date of Patent: Jan. 24, 2006

(54) MASS FLOWMETER HAVING MEASURING RANGES MEASURED BY TWO SEPARATE METHODS

(75) Inventor: Joost Conrad Lötters, Gaanderen (NL)

(73) Assignee: Berkin B.V., Ruurlo (NL)

( * ) Notice: Subject to any disclaimer, the term of this patent is extended or adjusted under 35 U.S.C. 154(b) by 0 days.

(21) Appl. No.: 10/843,412

(22) Filed: May 12, 2004

(65) Prior Publication Data

US 2004/0226360 A1   Nov. 18, 2004

(30) Foreign Application Priority Data

May 13, 2003   (NL) .................................. 1023405

(51) Int. Cl.
*G01F 1/68* (2006.01)

(52) U.S. Cl. .................................. 73/204.27

(58) Field of Classification Search ............. 73/204.27, 73/204.26, 204.17
See application file for complete search history.

(56) References Cited

U.S. PATENT DOCUMENTS

| | | | |
|---|---|---|---|
| 4,461,173 A * | 7/1984 | Olin | 73/202.5 |
| 4,800,754 A * | 1/1989 | Korpi | 73/202 |
| 5,339,687 A | 8/1994 | Pasdari et al. | |
| 6,370,950 B1 | 4/2002 | Lammerink | |
| 6,446,503 B1 * | 9/2002 | Nukui et al. | 73/197 |
| 6,637,264 B2 * | 10/2003 | Lotters et al. | 73/204.27 |

FOREIGN PATENT DOCUMENTS

EP   1 139 073   10/2001

* cited by examiner

*Primary Examiner*—Harshad Patel
(74) *Attorney, Agent, or Firm*—Young & Thompson

(57) ABSTRACT

A flowmeter of the thermal type with a single flow sensor is connected to control and temperature measuring elements for measuring in a first measuring range by a first measuring method and in a second measuring range by a second measuring method. Detection elements detect the measuring method to be selected on the basis of a flow measurement, and control elements control the flow sensor in accordance with the selected measuring method.

14 Claims, 4 Drawing Sheets

MASS FLOWMETER HAVING MEASURING RANGES MEASURED BY TWO SEPARATE METHODS

The invention relates to a mass flowmeter of the thermal type.

Various mass flowmeters operating by the thermal principle are known. In general, a flow of a fluid such as a gas or liquid flow, or a two-phase flow, whose flowrate is to be measured is made to pass through a flow tube in the form a laminar or turbulent flow. When the flow tube is locally heated, for example by means of a resistance wire coiled around the tube, heat is transmitted through the tube wall to the gas or liquid flow by thermal conduction. The fact that the gas or liquid flow carries along (transports) heat forms the basis for various methods of measuring the mass flowrate.

A known mass flowmeter of the thermal type is described, for example, in EP-A 1139073. This known mass flowmeter comprises a flow sensor in the form of a thermally conducting flow tube provided with a resistance wire coiled around the tube and acting as a heat source or heater and as a temperature sensor, in a first position, and with a temperature sensor located further upstream. A control circuit serves to keep the temperature difference between the temperature sensors constant during flowing, and the mass flowrate of the fluid flowing through the tube is determined from data of the control circuit. This method is called the constant temperature (CT) method. An alternative flowmeter utilizes the constant power (CP) measuring method, in which a constant power is supplied to a heater centrally located on a flow tube, and the temperature difference is measured between sensors arranged symmetrically with respect to the heater.

A disadvantage of such a measuring systems is that its applicability is restricted to a pre-defined measuring range. A different flow tube and/or different heater windings are necessary for use in a different measuring range.

The invention has for its object to provide a 'universal' mass flowmeter that can be used over a wider measuring range than was possible until now.

This object is achieved by means of a mass flowmeter of the thermal type which is characterized in that it comprises a single flow sensor which is connected to (power) control means and temperature measuring means for measuring in at least two measuring ranges, in a first measuring range by a first measuring method and in a second measuring range by a second measuring method.

The term 'flow sensor' in the present context is understood to denote an assembly of a carrier with two or more heater elements and temperature sensing means, which assembly is in a heat-exchanging relation with a fluid flow to be measured during operation.

The invention is based on the recognition that a mass flowmeter of the thermal type can be constructed such that it is capable of measuring by means of a single flow sensor in at least two mutually adjoining measuring ranges by two different measuring methods which can be switched on as desired (possibly automatically).

A simple and practical embodiment of the flow sensor on the basis of the above is characterized in that it is provided with a heater $H_1$ in a first (upstream) position A and a heater $H_2$ in a second (downstream) position B, and with means for determining the temperature difference between A and B. The knowledge where one is in combination with a clever control of the heaters renders it possible to adjust the measuring range as it were freely.

For certain applications, the carrier of the flow sensor is formed by a tube through which the fluid can flow and which carries two electrical windings internally or externally in positions A and B, thus forming the respective heaters $H_1$ and $H_2$. The electrical windings may have temperature-dependent resistance values and be included in a circuit for determining the temperatures at the locations A and B or the temperature difference between A and B. An alternative possibility of determining the temperature difference between A and B lies in the use of a thermopile which is in thermal contact with A at one side and with B at the other side.

For other applications, the carrier of the flow sensor is formed by a planar substrate, for example an IC or chip. It is possible to place thereon, for example, two heater elements, for example in the form of conductor tracks that may or may not be meandering and between which means are present for measuring a temperature difference between the heaters, such as a thermo-element or a thermopile.

Measuring methods suitable for use in combination with the flow sensor described above are in particular:

the TB (thermal balancing) method of measuring a flow from a genuine zero value over a given, low maximum range;

the CP (constant power) method of measuring a flow from approximately zero over a given, comparatively low maximum range;

the CT (constant temperature) method of measuring a flow from a given threshold value (lower limit of minimum flow to be detected) up to very high flow values.

The flowmeter according to the invention can be set such that the measuring ranges associated with the above measuring methods are mutually adjoining or—preferably—have a slight overlap.

It is favorable to start in the TB mode upon switching-on of the flowmeter. If it is detected that the instantaneous flow lies outside the measuring range of the TB measuring method, a switch is made to the CP measuring method. If it is detected that the instantaneous flow lies outside the measuring range of the CP measuring method, a switch is made to the CT measuring method. The measuring 'modes' are thus sequentially switched on. If a given signal value is undershot in a measuring range, a switch is made to the measuring method belonging to the next lower measuring range.

It is noted that the above does indeed describe a combination of the TB, CP, and CT measuring methods, but that other combinations may be practical, depending on the envisaged application: for example, CP and CT; TB and CP; TB and CT.

A first embodiment is characterized in this connection in that the measuring and control means are designed for measuring by the TB measuring method so as to supply electric power to $H_1$ and $H_2$ in alternation and are provided with a control loop for controlling the temperature difference between A and B down to zero in an iterative process. All this takes place as described in U.S. Pat. No. 6,370,950.

A second embodiment is characterized in that the measuring and control means are designed for measuring by the CP measuring method so as to operate $H_1$ and $H_2$ with constant power and to measure the temperature difference between A and B.

A third embodiment is characterized in that the measuring and control means are designed for measuring by the CT measuring method so as to measure the electric power to be supplied to $H_2$ necessary for keeping the temperature difference between A and B at a constant value.

The basic principle of the invention: coupling of at least two measuring methods with different measuring ranges in one device may be implemented in various manners.

These and other aspects of the invention will be explained in more detail below with reference to a few embodiments and the accompanying drawings. Corresponding components have been given the same reference symbols in the drawing, in which.

Figure 1:
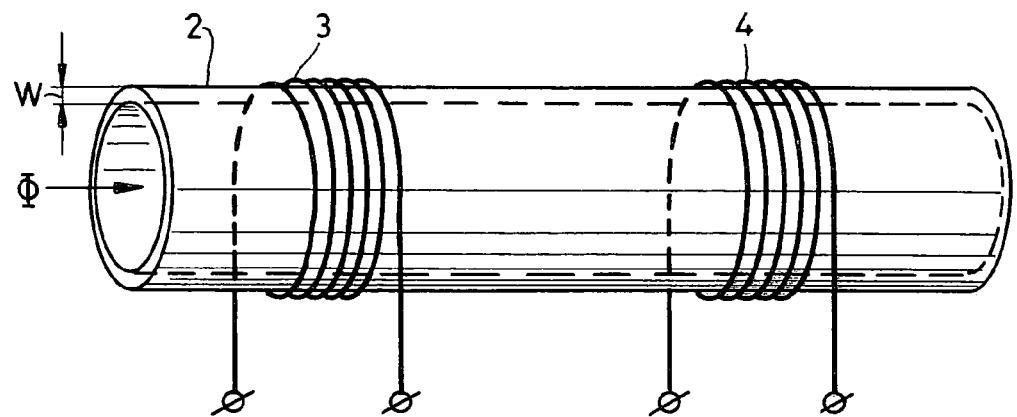
FIG. 1 shows a flow tube with two windings for a first embodiment of a flow sensor for a mass flowmeter according to the invention in perspective view.

FIG. 1 shows a stainless steel flow tube 2 with an internal diameter of approximately 0.8 mm and a wall thickness of approximately 0.1 mm of a mass flowmeter for a fluid $\phi$ flowing through the tube 2 in the direction of the arrow. The capacity of the tube 2 is approximately 2 kg per hour for the calibration liquid isopropyl alcohol (IPA), and 1 standard liter per minute for air. Resistance wires 3 and 4 of a temperature-sensitive resistance material, for example platinum or nickel or a nickel-iron alloy, of approximately the same resistance value by preference are coiled around the stainless steel tube 2 (in an electrically insulated manner) such that they can each serve both as a heating resistance and as a temperature sensor. It is possible with this flow sensor configuration to measure by the TB method, the CP method, and the CT method.

Figure 2A:
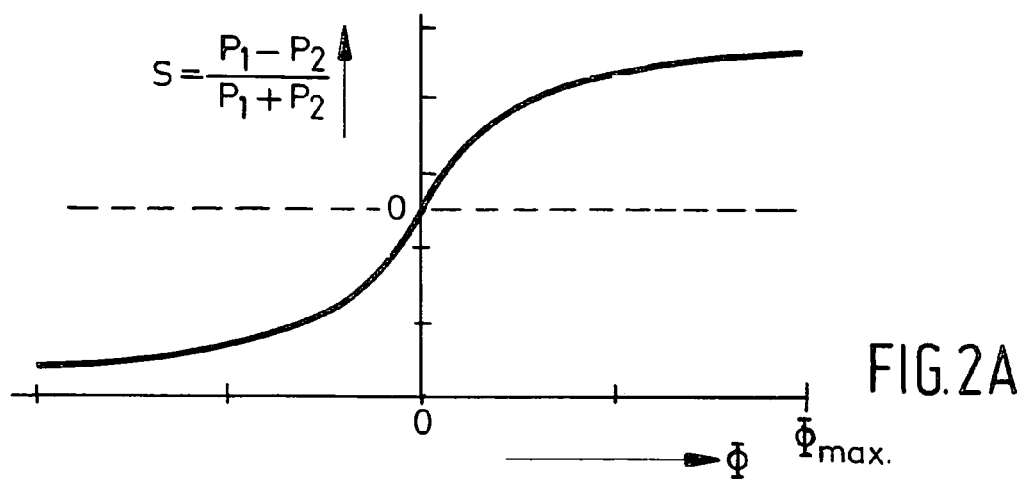
FIG. 2A is a graph showing the relation between the output signal S=(P1−P2)/(P1+P2) and the flow $\phi$ in measurements by the TB principle.
Figure 2B:
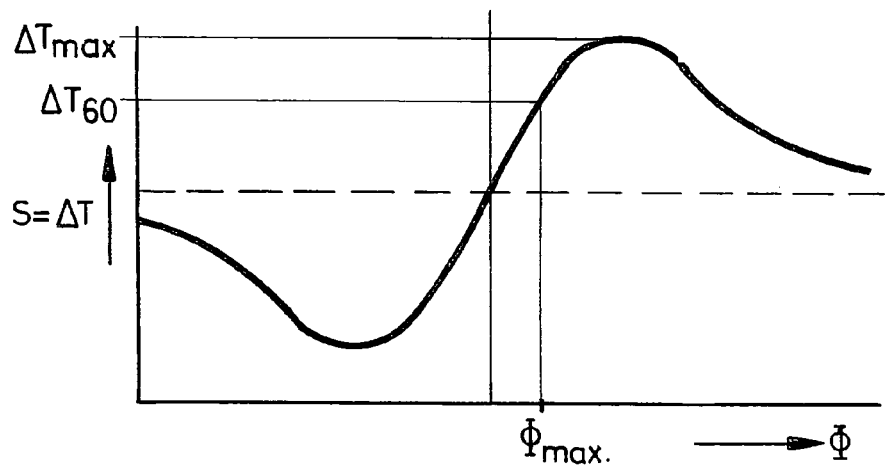
FIG. 2B is a graph showing the relation between the measured temperature difference $\Delta T$ between two positions and the flow $\phi$ in measurements by the CP principle.
Figure 2C:
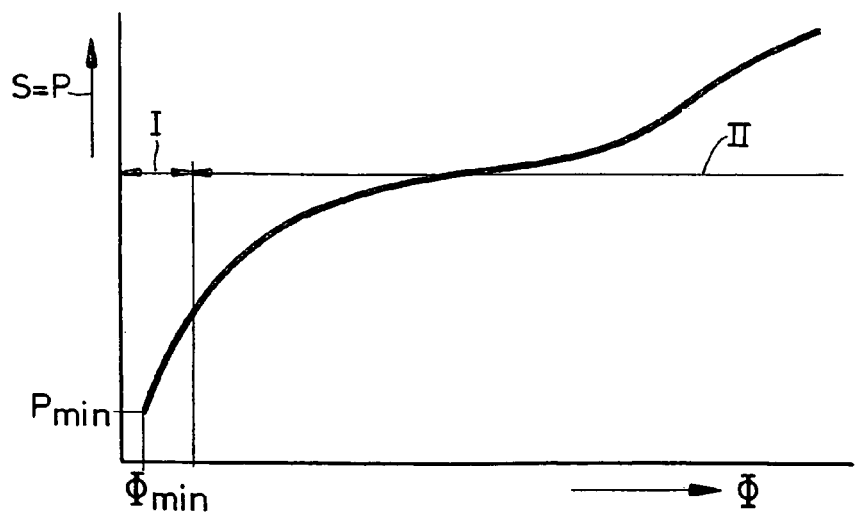
FIG. 2C is a graph showing the relation between the input power P and the flow $\phi$ in measurements by the CT principle.

The stainless steel flow tube 2 conducts heat so well that it is possible to measure the temperature of a medium flowing through the tube 2 by means of the wire 3 wound around the tube 2 in an upstream position. An electric power P is supplied to the wire 4 wound around the tube 2 in a downstream position such that the temperature in this position will always lie above that of the medium in the first position mentioned above by a given constant value $\Delta T$ ($\Delta T \leq 5°$ C. for liquids, $\Delta T \leq 30°$ C. for gases). The electric power P to be supplied in order to keep $\Delta T$ constant during the flow of the medium is measured and is a measure for the flow. This measuring principle is known as the constant temperature (CT) method. FIG. 2C shows the relation between the supplied electric power P and the mass flow $\phi$ when this method is used in a flowmeter of the kind depicted in FIG. 1.

The CT method has a wide range in upward direction, but below a certain minimum value $\phi_{min}$ of the flow this measuring method becomes insensitive. At a value of P slightly above $P_{min}$, for example at S=1.05 $P_{min}$, therefore, a switch is made to the CP method, which provides a better sensitivity but a narrower measuring range. It is possible, however, to have the latter merge into the range of the CT method. The operation is as follows: the two windings 3 and 4 each act both as a heater and as a sensor, i.e. electric power is supplied to both of them. This power is constant. The heat developed by the heaters dissipates through the tube wall. If there is no flow through the tube 2 ($\phi$=0), a symmetrical temperature distribution will arise across the tube 2. If there is a flow through the tube 2, the upstream tube wall will cool down and the downstream tube wall will heat up. The temperature difference $\Delta T$ (=$T_3$−$T_4$) thus arising between 3 and 4 is detected by the temperature-sensitive resistances 3 and 4 and is a measure for the flow. FIG. 2B shows the relation between $\Delta T$ and the flow $\phi$. The maximum measuring range is achieved when the upstream tube wall has cooled down fully and the downstream tube wall has heated up fully. A given tube wall thickness represents a certain sensitivity and a certain measuring range. The sensitivity falls as the tube wall thickness increases (the maximum differential temperature becomes less because the heat 'leakage' may be greater, but the measuring range increases: the minimum detectable differential temperature does not occur until a higher flow is achieved). Measurable maximum values in the CP method are, for example, gases up to 20 ml/min and liquids up to 2 g/hour.

A suitable point of transition to the measuring range of the CT method is, for example, at $\Delta T_{60}$ ($\Delta T$ is 60% of $\Delta T_{top}$). The point of transition may be laid down in a microprocessor.

For very small flowrates, or as an alternative to the CP measuring method discussed above, the TB method described below may be used. This involves the use of a flow sensor in which the colder of the two heaters $H_1$ and $H_2$ is always supplied with power, and in which a control loop controls the measured temperature difference down to a zero value in an iterative process. The asymmetry of the power supply to the heaters for meeting the zero criterion is a measure for the flowrate. The TB method has an extremely stable and accurate zero point without offset.

A suitable value to which the transition to the CP measuring method may be adjusted lies approximately at S=0.25 $P_{tot}$ with the use of a tube as the carrier of the sensor components, where $P_{tot}$ is the total power supplied to the heaters 3 and 4, i.e. $P_3$+$P_4$, and S=($P_3$−$P_4$)/($P_3$+$P_4$). For a planar substrate as the carrier it holds that the transition lies approximately at S=0.42 $P_{tot}$.

Figure 5:
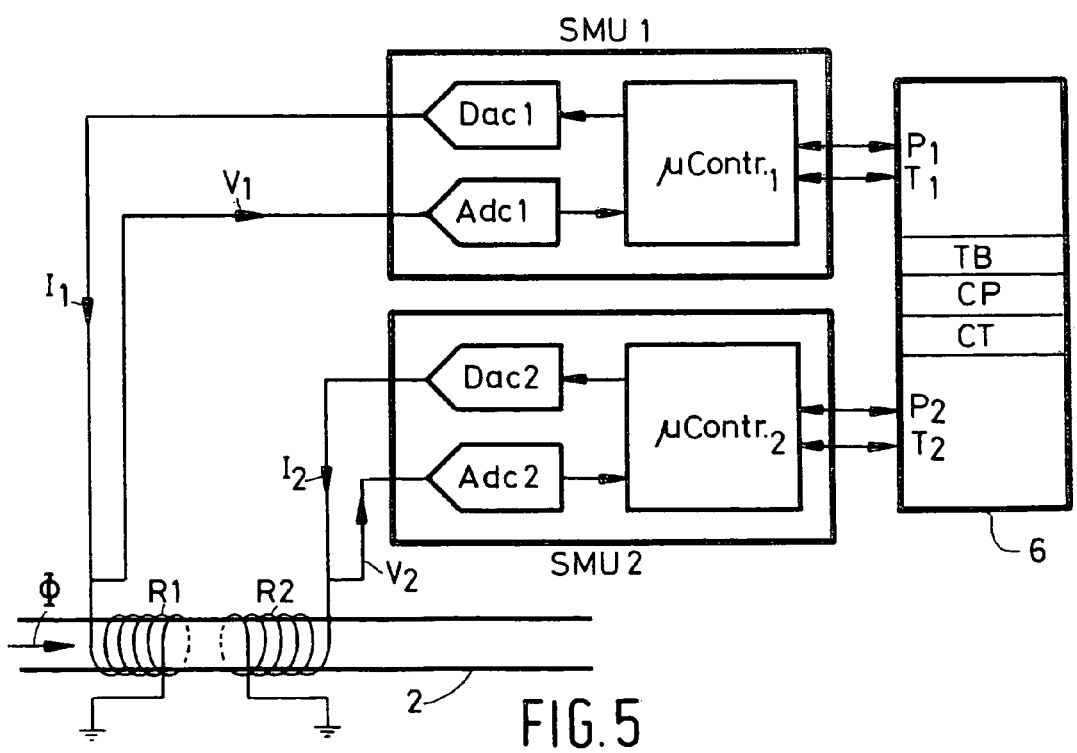
FIG. 5 is an operational diagram of an embodiment of the measuring system according to the invention.

The operation of the total measuring system according to the invention will now be explained with reference to the operational diagram shown in FIG. 5. FIG. 5 is a block diagram of the operation of a flow sensor with a flow tube 2 through which a fluid to be measured flows in the direction of an arrow $\phi$. The tube 2 supports a winding of resistance wire $R_1$ in an upstream location and a winding of resistance wire $R_2$ in a downstream location, each capable of functioning as a heater and as a temperature sensor. $R_1$ is connected to a measuring and control block, which is a power control block, a source measurement unit 1 (SMU 1) in the present case comprising a microcontroller $\mu$Contr.1 and digital-to-analog converter Dac1 for passing a controlled, known current $I_1$ through $R_1$ (source portion), while the voltage drop $V_1$ across $R_1$ is measured by means of an analog-to-digital converter Adc1 (measurement portion). With these two data $I_1$ and $V_1$ and a calibration table ($R_T$=$R_0$(1+$\alpha \Delta T$)) of $R_1$, the dissipated electric power P and (via the table) the temperature are also known. $R_2$ is similarly connected to a source measurement unit 2 (SMU 2). The SMUs are connected to a (differential) control unit 6 which controls them and which generates the output signal S of the measuring system in dependence on the measuring mode: TB, CP, or CT, i.e. $S=(P1-P2)/(P1+P2)$; $S=\Delta T$; $S=P$.

It is to be noted that FIG. 5 only shows three electrical contacts per winding $R_1$ and $R_2$, but that preferably a four-contact measurement is carried out (so-termed Kelvin contacts).

Figure 7:
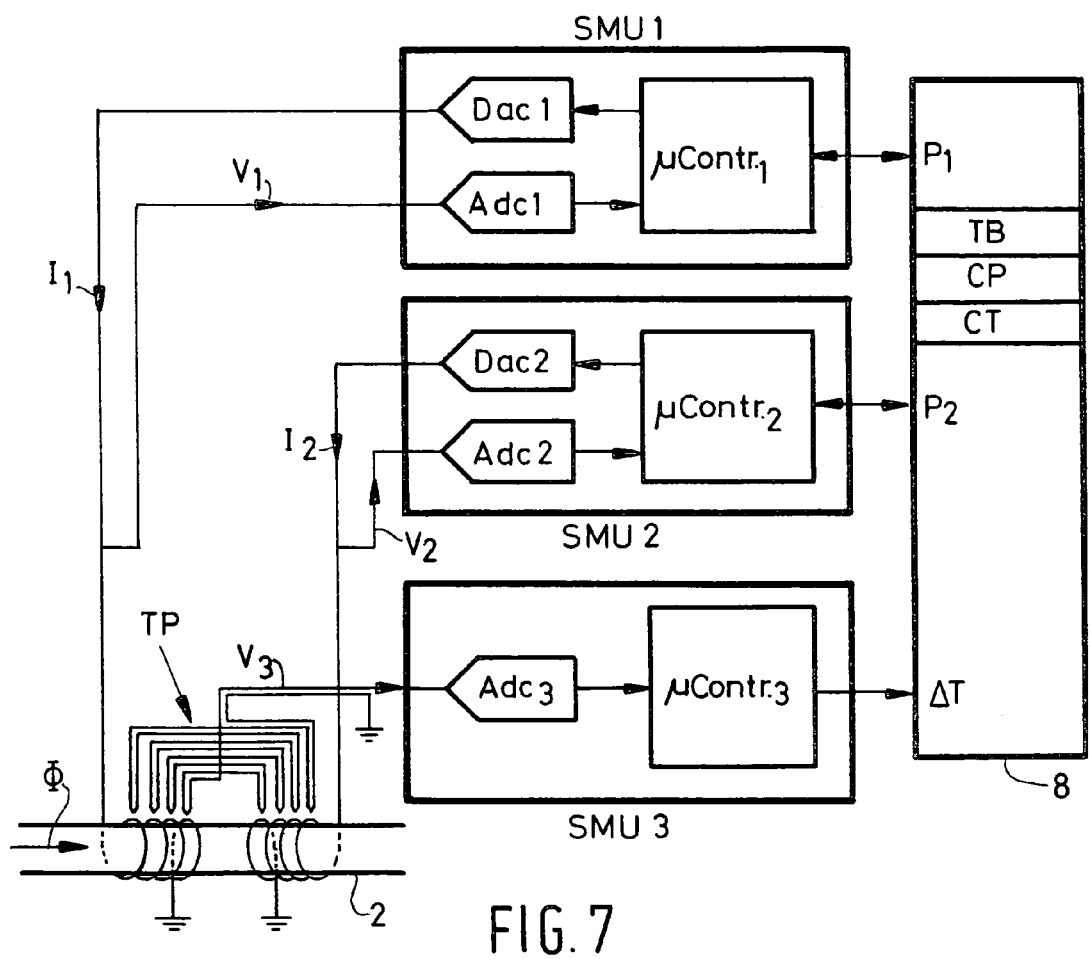
FIG. 7 is an operational diagram of an alternative embodiment of a measuring system according to the invention.

An alternative to the measurement of the resistances of $R_1$ and $R_2$ so as to determine their temperatures and thus their temperature difference is the use of a thermopile which is in thermal contact with the region of $R_1$ at one end and with the region of $R_2$ at the other end. The use of such a thermopile TP is illustrated in FIG. 7. The voltage delivered by the thermopile TP is read out in the source management unit 3 (SMU 3), and the test result $\Delta T$ is fed to a control unit 8 comparable to the control unit 6 of FIG. 5.

Figure 4:
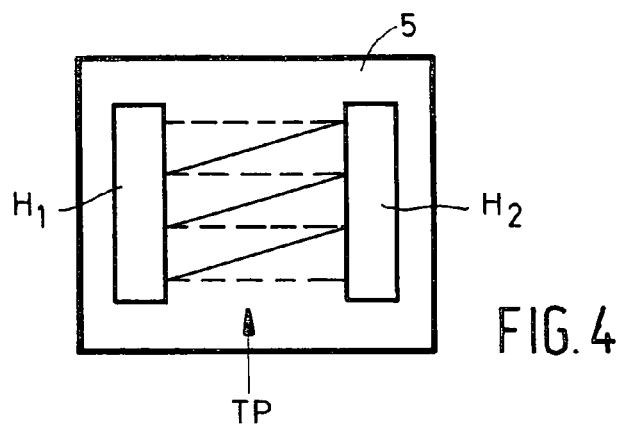
FIG. 4 shows a flow sensor arrangement with a planar substrate in plan view.

A thermopile TP may be used to particular advantage where a planar substrate 5 is used as the carrier for the heater elements $H_1$ and $H_2$ (FIG. 4). In that case the heater elements $H_1$ and $H_2$ may be provided on the substrate in the form of, possibly meandering, conductor tracks on the substrate 5 with the thermopile TP in between. The substrate may have a very small thickness (for example <100 $\mu$m) and a small surface area (for example <5×5 mm) and is accordingly suitable for special applications. It may be mounted on a pin that is passed through the tube wall such that the measurement can take place locally inside the flow tube. The substrate 5 may be mounted on a foil with conductor tracks or on a PCB in order to make possible electrical connections to control and measurement circuits. This 'chip' version of the flow sensor renders it possible to measure also outside the flow tube, indeed in any space whatsoever.

Figure 6:
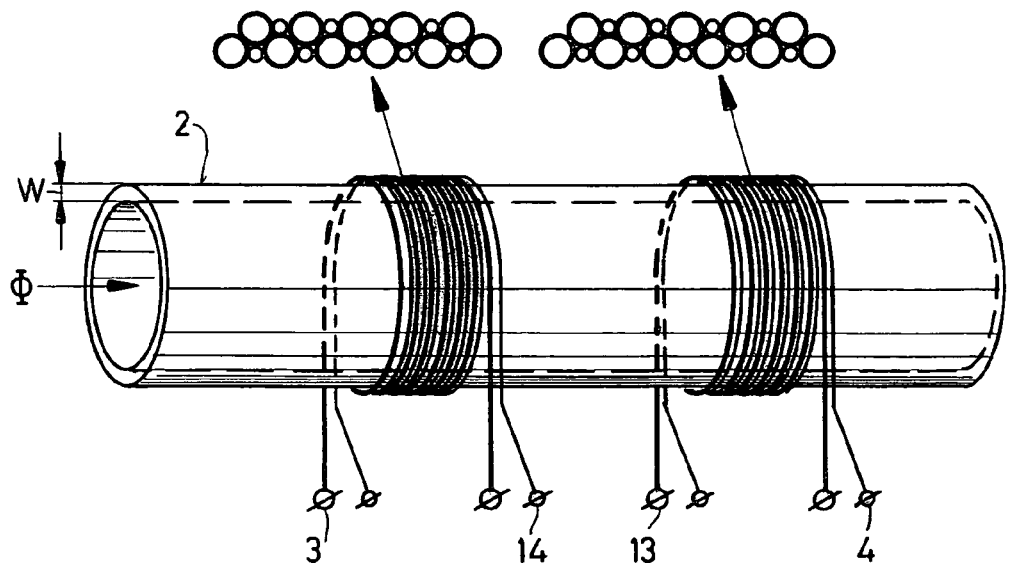
FIG. 6 shows a flow tube with windings for a further embodiment of a flow sensor according to the invention.

Since the implementation of the CP and TB measuring methods both supplies electric power to the windings (heater function) and measures the temperature (sensor function) in each of the (upstream and downstream) measuring positions, it may be practical to separate the two functions, as is shown in FIG. 6.

In the flow sensor of FIG. 6, the upstream winding 3 of FIG. 1 is subdivided into two parts, each having a distinctive function, i.e. a heater part 3 in which power is dissipated and a temperature sensor part 14 that detects the temperature of the heater and of the medium. The two separate windings 3 and 14 are preferably intertwined. It is important that both the temperature sensor 4 and the temperature sensor 14 can be made from resistance wire originating from the same reel, so that they have identical temperature resistance coefficients. Their resistance values should preferably also be exactly the same. To give the heater 3 as large as possible a heat-exchanging surface area, the resistance wire for the heater 3 is preferably given a greater diameter than the resistance wire for the sensors 4 and 14.

FIG. 6 shows a temperature-sensing part 4 and a heater part 13 also for the downstream winding 4. The same holds for this heater/sensor combination as for the winding 3.

Instead of a set of wire windings coiled around the tube, for example, a resistor pattern provided on a foil wrapped around the tube may be used as the heater and/or sensor resistance. This may be provided inside the flow tube, if so desired.

A mass flowmeter according to the invention is applicable in many fields, for example as a liquid flowmeter in combination with a control valve in a method of manufacturing glass fibers for telecommunication. The sensor measures and controls a flow of a silicon-containing liquid such as methyltrichlorosilane or TEOS. This liquid is brought into the vapor phase by means of a vaporizer. Silicon is bound to oxygen so as to form glass in a chemical vapor deposition (CVD) process. This glass, in rod shape, is subsequently drawn into long glass fibers while being heated.

Another application is research and development in the field of fuel cells. The sensor is used, for example, in combination with a control valve or a pump for supplying a fuel, such as methanol or gasoline, and water to the cell.

Figure 3:
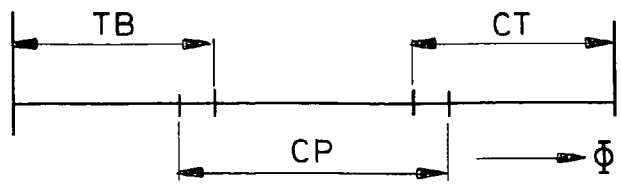
FIG. 3 shows a coupling of measuring ranges according to the invention.

FIG. 3 diagrammatically depicts the relative locations of the measuring ranges associated with the measuring methods to be switched on within the context of the present invention. If, for example, the measuring methods CP and CT are to be switched on, and if it is possible, for example, to measure from 1% to 100% in each of their measuring ranges (range 1:100), then a switch-over from the one measuring method to the other one will give a total measuring range of 1:10,000. Even wider ranges can be achieved within the scope of the invention, for example in that the TB measuring method is additionally switched on for the lower flowrates. This is of particular importance for medical, analytical, fuel cell, and natural gas applications.

The invention also covers modifications of the embodiments described above.

Thus the flow sensor may comprise further resistances in other locations on the tubular or planar carrier in addition to the two electrical resistances mentioned above.

The block diagrams of FIG. 5 and FIG. 7 show separate microcontrollers $\mu$Contr.1, $\mu$Contr.2, $\mu$Contr.3. It is possible for only one microcontroller to be present in combination with a multiplexer that offers the signals to this microcontroller in a correct manner.

In the situation of a flow sensor whose electrical resistances are provided on a planar substrate, these resistances may be made from a temperature-sensitive material and may be used for measuring the temperature difference between them. A thermo-element or a thermopile is not necessary in that case.

In the situation in which the electrical resistances are coiled as resistance wires around a tubular carrier, the means for measuring the temperature difference may comprise a thermo-element or a thermopile provided on a foil wrapped around the carrier. The foil may even lie inside the tubular carrier.

It is even possible to provide the resistors themselves (the heaters) on the foil and to provide the latter around (or in) the tubular carrier.

It is noted that flow sensor arrangements other than those shown in the embodiments may be used.

Thus, for example, a flow tube may be used with an upstream temperature sensor winding, a downstream heater/sensor winding, and an interposed Peltier element. The Peltier element is used as a heater during measurements in the CP mode while the upstream and downstream windings serve as temperature sensors. During measurements in the CT mode the windings operate in the manner described above for the CT method, and the Peltier element is controlled such that it provides cooling in the case of no flow or a weak flow so as to prevent an undesirable heating of the upstream sensor via the tube.

Summarizing, the invention relates to a flowmeter of the thermal type with a single flow sensor which is connected to control and temperature measuring means for measuring in a first measuring range by a first measuring method and in a second measuring range by a second measuring method. Detection means detect the measuring method to be selected on the basis of a flow measurement, and control means control the flow sensor in accordance with the selected measuring method.

The invention claimed is:

1. A mass flowmeter of the thermal type, comprising a single flow sensor which is connected to control means and temperature measuring means for measuring in at least two measuring ranges, in a first measuring range by a first measuring method and in a second measuring range by a second measuring method, wherein the control and temperature measuring means allow measurements by at least two of the following measuring methods:
   the TB (thermal balancing) method of measuring flows, from zero;
   the CP (constant power) method;
   the CT (constant temperature) method of measuring flows from a given threshold value up to high values.

2. A mass flowmeter as claimed in claim 1, provided with a heater $H_1$ in a first (upstream) position A and a heater $H_2$ in a second (downstream) position B, and with means for determining the temperature difference between A and B.

3. A mass flowmeter as claimed in claim 2, wherein the heaters $H_1$ and $H_2$ are supported as electric windings of resistance wire by a tube.

4. A mass flowmeter as claimed in claim 2, wherein the heaters $H_1$ and $H_2$ are provided in the form of conductor tracks on a planar substrate.

5. A mass flowmeter as claimed in claim 2, wherein the measuring and control means are designed for measuring by the TB measuring method so as to supply electric power to $H_1$ and $H_2$ in alternation and are provided with a control loop for controlling the temperature difference between A and B down to zero in an iterative process.

6. A mass flowmeter as claimed in claim 2, wherein the measuring and control means are designed for measuring by the CP measuring method so as to operate $H_2$ and $H_2$ with constant power and to measure the temperature difference between A and B.

7. A mass flowmeter as claimed in claim 2, wherein the measuring and control means are designed for measuring by the CT measuring method so as to measure the electric power to be supplied to $H_2$ necessary for keeping the temperature difference between A and B at a constant value.

8. A mass flowmeter as claimed in claim 2, wherein the means for determining the temperature difference between A and B comprise a thermoelectric pile provided between the heaters $H_1$ and $H_2$ and thermally coupled at one side to A and at the other side to B.

9. A mass flowmeter as claimed in claim 1, wherein the measuring ranges associated with the measuring methods used at least adjoin one another.

10. A mass flowmeter as claimed in claim 9, wherein the measuring ranges have slight overlaps.

11. A mass flowmeter as claimed in claim 1, wherein the measuring ranges used are switched on in order of rising measuring range value during starting.

12. A mass flowmeter as claimed in claim 1, wherein it is provided with detection means for selecting the measuring method on the basis of a flow measurement.

13. A mass flowmeter as claimed in claim 1, wherein the measuring ranges associated with the measuring methods used adjoin one another.

14. A mass flowmeter as claimed in claim 1, wherein the measuring ranges have slight overlaps.

* * * * *